(12) United States Patent
Huchard et al.

(10) Patent No.: US 8,527,134 B2
(45) Date of Patent: Sep. 3, 2013

(54) METHOD AND DEVICE FOR IDENTIFYING THE POSITION OF A WHEEL OF A VEHICLE

(75) Inventors: Xavier Huchard, Pont du Chateau (FR); Philippe Corniot, Enval (FR); Thierry Penot, Clermont-Ferrand (FR)

(73) Assignees: Compagne Generale des Etablissements Michelin, Clermont-Ferrand (FR); Michelin Recherche et Technique S.A., Granges-Paccot (CH); TRW Automotive U.S., LLC, Livonia, MI (US)

( * ) Notice: Subject to any disclaimer, the term of this patent is extended or adjusted under 35 U.S.C. 154(b) by 270 days.

(21) Appl. No.: 13/126,121

(22) PCT Filed: Oct. 23, 2009

(86) PCT No.: PCT/EP2009/063946
§ 371 (c)(1),
(2), (4) Date: Jun. 16, 2011

(87) PCT Pub. No.: WO2010/049352
PCT Pub. Date: May 6, 2010

(65) Prior Publication Data
US 2011/0288720 A1    Nov. 24, 2011

(30) Foreign Application Priority Data

Oct. 27, 2008  (FR) ...................................... 08 57294

(51) Int. Cl.
*B60C 23/04* (2006.01)
*G01M 17/013* (2006.01)
*G06F 19/00* (2011.01)

(52) U.S. Cl.
USPC ...................... 701/29.1; 701/30.5; 324/207.25

(58) Field of Classification Search
USPC ................ 701/29.1, 1, 36, 30.5; 324/207.25, 324/207.21; 702/151; 340/447; 73/146.5
See application file for complete search history.

(56) References Cited

U.S. PATENT DOCUMENTS

| | | | | |
|---|---|---|---|---|
| 4,334,428 A | * | 6/1982 | Fima et al. | 73/146.5 |
| 7,055,917 B2 | | 6/2006 | Huchard et al. | 303/188 |
| 7,395,701 B2 | | 7/2008 | Huchard | 73/146 |
| 7,648,062 B2 | | 1/2010 | Corniot | 235/375 |
| 2002/0109501 A1 | * | 8/2002 | Schroeder | 324/207.21 |
| 2006/0142911 A1 | | 6/2006 | Allard et al. | 701/29 |
| 2007/0222570 A1 | * | 9/2007 | Ou et al. | 340/447 |

(Continued)

FOREIGN PATENT DOCUMENTS

| EP | 0 760 299 A1 | 3/1997 |
|---|---|---|
| EP | 1 669 221 A1 | 6/2006 |

(Continued)

*Primary Examiner* — Tan Q Nguyen
(74) *Attorney, Agent, or Firm* — Fitzpatrick, Cella, Harper & Scinto (57) ABSTRACT

A method of identifying a position of a wheel of a vehicle includes: providing, in at least one wheel of the vehicle, a device with at least one magnetic sensor with a maximum sensitivity axis; starting up the vehicle; measuring at terminals of each magnetic sensor a signal representative of magnetic flux time variations during rotation of the wheel; determining a characteristic quantity of the signal; comparing the characteristic quantity to a given threshold; and determining, according to a comparison result, a front or rear location of the wheel.

30 Claims, 7 Drawing Sheets

(56) References Cited

U.S. PATENT DOCUMENTS

| | | | |
|---|---|---|---|
| 2008/0197837 A1 | 8/2008 | Dulac | 324/207.16 |
| 2009/0144017 A1 | 6/2009 | Penot et al. | 702/150 |
| 2010/0288039 A1 | 11/2010 | Liberge et al. | 73/146.5 |

FOREIGN PATENT DOCUMENTS

| | | |
|---|---|---|
| EP | 1 800 913 A1 | 6/2007 |
| FR | 2 888 656 A1 | 1/2007 |
| WO | WO 2006/104484 A1 | 10/2006 |

\* cited by examiner

METHOD AND DEVICE FOR IDENTIFYING THE POSITION OF A WHEEL OF A VEHICLE

FIELD OF THE INVENTION

The invention relates to an identification method of identifying the front-rear or left-right position of a wheel of a vehicle. It also relates to a system for monitoring the wheels of a vehicle fitted with devices implementing the identification method.

TECHNICAL BACKGROUND

More and more motor vehicles now have, for safety purposes, monitoring systems that include sensors fitted on each of the wheels of the vehicle, dedicated to measuring parameters, such as pressure or temperature of the tyres of the wheels, and intended to inform the driver of any abnormal variation of the measured parameters.

These monitoring systems usually include a sensor placed in each wheel with a microprocessor and a radiofrequency transmitter, as well as a central processing unit for receiving signals sent by the transmitters, in which the central processing unit includes a computer incorporating a radiofrequency receiver connected to an antenna.

One of the problems that such monitoring systems have to resolve lies in the obligation of having to associate, with each signal received by the receiver of the central processing unit, an indication concerning the location of the sensor and therefore of the wheel from where the signal originates, this obligation lasting throughout the life of the vehicle, even after wheel changes or simple reversals of the positions of the wheels.

The document EP 1 669 221 A1 presents a stand-alone device intended to be supported by a wheel for locating the right or left position of the wheel in a vehicle. The device includes:
- two magnetic sensors with maximum sensitivity axes;
- means of measuring a signal at the terminals of each of the magnetic sensors, the means being able to deliver two periodic signals phase-shifted relative to each other and each representative of magnetic flux time variations detected by the magnetic sensors during rotation of the wheel; and
- a computation unit programmed to determine, from the phase shift between the two periodic signals, a direction of rotation of the wheel.

The knowledge of the direction of rotation of the wheel makes it possible to deduce, given that a direction of movement of the vehicle is known otherwise, the right or left location of the wheel.

The above device is configured such that the maximum sensitivity axes of he two magnetic sensors are intended to be placed in the tyre and wheel assembly in a secant plane relative to the axis of rotation of the wheel (i.e., an assembly of the wheel and a tyre), and offset relative to each other, in this secant plane, by a predetermined angle.

The two sensors of this device detect a global magnetic field surrounding them, consisting of the earth's magnetic field added to the vehicle's environmental magnetic field. The vehicle's environmental magnetic field is the resultant of a set of vehicle fields created by the presence of electrical or magnetic equipment installed in the vehicle and by metal parts close to wheel housings, such as brake callipers and elements linking to the ground.

There are, however, points on the terrestrial globe and directions of movement of the vehicle for which the contribution of the earth's magnetic field measured by the two sensors of the device become negligible relative to the contribution of the environmental magnetic field.

Devices such as that described above make it possible to locate only the left or right position of a wheel on a vehicle, but not the front or rear position.

Patent application publication WO 2006/104484 discloses a device and a method for identifying the position of a wheel of a vehicle, in which each wheel housing is fitted with specific magnetic field generators and each wheel is fitted with a magnetic field sensor. When the vehicle moves, each magnetic field sensor delivers a signal linked to the magnetic field generators specific to the position of the wheel, and analysis of this signal makes it possible to identify the front or rear and left or right position of this wheel.

SUMMARY OF THE INVENTION

An embodiment of the invention relates to a method of identifying a position of a wheel on a vehicle. The method includes the following steps:
- providing, in at least one wheel of the vehicle, a device with at least one magnetic sensor with a maximum sensitivity axis;
- starting up the vehicle;
- measuring at terminals of each magnetic sensor a signal representative of magnetic flux time variations during rotation of the wheel;
- determining a characteristic quantity of each representative signal;
- comparing each characteristic quantity to a given threshold; and
- determining, according to a comparison result, a front or rear location of the wheel.

This method uses a usual difference in local magnetic field between a front wheel housing and a rear wheel housing of a vehicle to detect the front or rear location of the wheel. The given threshold is determined by preliminary tests for the vehicle concerned. This method has the advantage of being very easy to implement with particularly simple means.

In a method according to an alternative or complementary embodiment:
- there is provided, in at least one second wheel of the vehicle, a device with at least one magnetic sensor with a maximum sensitivity axis, such that one of the devices is fitted on a front wheel and the other of the devices is fitted on a rear wheel of the vehicle;
- a characteristic quantity of a representative signal is determined for each device;
- the characteristic quantities of the representative signals from the devices are transmitted to a central processing unit of the vehicle; and
- a front or rear location of each of the wheels is determined by comparing the characteristic quantities.

This method uses a comparison between the characteristic quantities of two signals to identify the positions of the wheels.

The characteristic quantity that is determined can be a function of an energy of the representative signal.

The characteristic quantity can also be obtained by calculating an integral of an absolute value of the representative signal during a given time.

To reinforce the robustness of the front or rear identification, a magnetic field generator, such as a magnet, can be included in the vehicle close to a wheel fitted with a device.

It is also possible to reinforce the magnetization of one of the metal parts of the vehicle, close to a wheel fitted with a device.

Advantageously, there are, in each device, two magnetic sensors with different azimuth angles and in similar positions relative to the axis of rotation of the wheel.

"Similar" should be understood to mean positions that can be practically superimposed by a rotation about the axis of rotation of the wheel. The positions of the two maximum sensitivity axes may, however, not be strictly superimposable notably because of the manufacturing differences of the devices and differences in their installation in tyre and wheel assemblies. The scale of offsets allowed by this term "similar" is a few degrees of inclination relative to each other.

The two magnetic sensors are designed to be positioned at different azimuths. Consequently, signals obtained from the two sensors will be linked not only to their rotation in the earth's magnetic field but also to the fact that they see the same local magnetic field successively.

Advantageously, each device includes a filtering element adapted to eliminate components of the two signals with frequencies less than or equal to a given frequency.

The contribution due to the earth's magnetic field is periodic and has a frequency identical to that due to rotation of the wheel. On the other hand, signals originating from the magnetic dipoles of the vehicle (i.e., the local or environmental magnetic field) are more localized; their major frequency components can thus be greater than twice the frequency of rotation of the tyre and wheel assembly. Consequently, the filtering element, when included in the device, very strongly reduces the contribution to the signals associated with the earth's magnetic field and thus allows for a robust analysis of the signals linked to the environmental magnetic field.

As previously discussed in connection with the document EP 1 669 221, the signals measured at the terminals of each sensor present a mutual phase shift. However, the analysed signals are mainly linked to the contribution of the environmental magnetic field of the vehicle and not to the earth's magnetic field, and this phase shift is mainly linked to a time amplitude of a circumferential offset of azimuths between the two sensors.

The filtering element can be a filter that is a high-pass-type with a cut-off frequency greater than the frequency of rotation of the wheel.

Such a filter can be an adaptive filter, dependent on the speed of rotation of the wheel.

The adaptive filter can be looped back on the amplitude of the analysed signal. This loopback mode has the benefit of being easier to implement than a loopback on the frequency of rotation of the wheel.

According to a particularly simple and cost-effective embodiment, the filtering element can be a high-pass-type filter with a cut-off frequency higher than the target range of operating frequencies of the device. As an example, for private vehicle wheels of usual dimensions and for a target operating range of 20 to 120 km/h, the range of rotation frequencies is then of the order of 3 to 17 Hz and the filter has a cut-off frequency greater than 17 Hz.

The filtering element also can be a low-pass-type filter of the order of 100 to 200 Hz. This low-pass filter makes it possible to reduce noise in the analysed signals.

Advantageously, the two magnetic sensors are designed to be placed on the wheel at substantially the same distance from the axis of rotation of the tire and wheel assembly.

This enables coils of the sensors to be sensitive to flux variations in the same environmental field.

The two magnetic sensors can have their two maximum sensitivity axes combined or be designed to be placed in the wheel with their maximum sensitivity axes circumferentially oriented.

In these two very similar embodiments, thanks to the presence of the filtering element, the signals after filtering are mainly linked to the components of the environmental magnetic field normal to the axial direction. These embodiments can be particularly useful in certain vehicle configurations.

According to an embodiment, the two magnetic sensors are designed to be placed in the tyre and wheel assembly so that the two maximum sensitivity axes are oriented parallel to the axis of rotation of the wheel.

Orienting the two maximum sensitivity axes of the two magnetic sensors parallel to the axis of rotation means that, whatever the orientation of the earth's magnetic field, this field has practically no influence on the amplitude of the signals measured at the terminals of the two magnetic sensors. The amplitude of the signals is then linked solely to the environmental field surrounding the device.

In an embodiment, a characteristic quantity of signals from two magnetic sensors of a device is a self-correlation function of these signals calculated during a given time.

Advantages of this feature are that it is insensitive to the form of the measured signals, and that it makes it possible to accumulate information over a sufficiently long period in order to improve the signal-to-noise ratio of a decision criterion and thus provide an unequivocal response.

Advantageously, based on the self-correlation function of the signals from the magnetic sensors of the device, and by comparison to a given threshold, the front or rear position of the wheel fitted with the device is determined.

Based on the self-correlation function, it is also possible to determine a phase shift, or more simply a sign of a phase shift, between the two signals at the terminals of the magnetic sensors, and deduce therefrom a direction of rotation of the wheel fitted with the device.

And, by also determining a direction of movement of the vehicle, it is possible, based on the characteristic quantity, the direction of rotation of the wheel, and the direction of movement, to determine a left or right and front or rear position of the wheel fitted with the device is determined.

It is possible in particular to easily determine a direction of movement of the vehicle by comparing a characteristic quantity to a given threshold. A value of the characteristic quantity is in effect dependent on the speed of the vehicle and, above a certain speed, it is possible to be certain that the vehicle is running forward.

The left or right and front or rear location or position can thus be established at the level of a wheel device. This location is then transmitted directly to a central processing unit.

The location can also be established by the central processing unit positioned in the vehicle from the various indications transmitted by devices that are fitted in wheels of the vehicle.

In an embodiment, a circumferential distance between centres of the two magnetic sensors is between 1 and 8 cm. A distance less than 1 cm does not allow determining with sufficient accuracy a phase shift between the two signals with usual acquisition frequencies, and a distance greater than 8 cm makes it difficult to integrate the two magnetic sensors in a single housing.

A device can notably be adapted to be fixed to a tyre inflating valve.

Another embodiment of the invention is directed to a system for monitoring wheels of a vehicle. The system includes:
for each wheel, a device with:

at least one magnetic sensor with a maximum sensitivity axis;
a signal measuring circuit that measures, at terminals of each magnetic sensor, a signal representative of magnetic flux time variations during rotation of the wheel;
a computation unit; and
a transmitter, and
in the vehicle, a central processing unit with a receiver and a processing unit.

This system is characterized in that each magnetic sensor of a device has its maximum sensitivity axis arranged parallel to an axis of rotation of a corresponding wheel, in that a computation unit of each device is able to calculate a characteristic quantity that is a function of an energy of the signal measured at terminals of the magnetic sensor of the device, and in that the processing unit of the central processing unit is able to determine, from the characteristic quantities transmitted by the devices of the wheels of the vehicle, front or rear locations of each of the devices of the vehicle.

Another embodiment of the invention relates to a system for monitoring wheels of a vehicle. The system includes:
for each wheel, a device with:
two magnetic sensors with maximum sensitivity axes;
a signal measuring circuit that measures, at terminals of each of the magnetic sensors, a signal representative of magnetic flux time variations during rotation of a corresponding wheel;
a computation unit; and
a transmitter, and
in the vehicle, a central processing unit with a receiver and a processing unit.

This system is characterized in that the two magnetic sensors of a device are positioned at different azimuths and similar positions relative to an axis of rotation of a corresponding wheel, in that the computation unit of each device is able to calculate a self-correlation function of the signals measured at the terminals of the two magnetic sensors of the device, and in that the processing unit of the central processing unit is able to determine, from the self-correlation functions transmitted by the devices of the wheels of the vehicle, front or rear and left or right locations of each of the devices.

BRIEF DESCRIPTION OF THE DRAWINGS

The invention will be better understood from the description presented below considered in conjunction with the attached drawings, of which.

These figures illustrate embodiments of a device in which magnetic sensors thereof have their maximum sensitivity directions oriented axially, but also applies to other embodiments. The figures are given purely for illustrative purposes and are in no way limiting of the scope of the claimed invention.

DESCRIPTION OF EMBODIMENTS

Hereinafter, the term "wheel" should be understood to mean an assembly that includes a wheel with a nave plate and a rim, and with a tyre fitted on the rim of the wheel.

Figures 1, 2, 3:
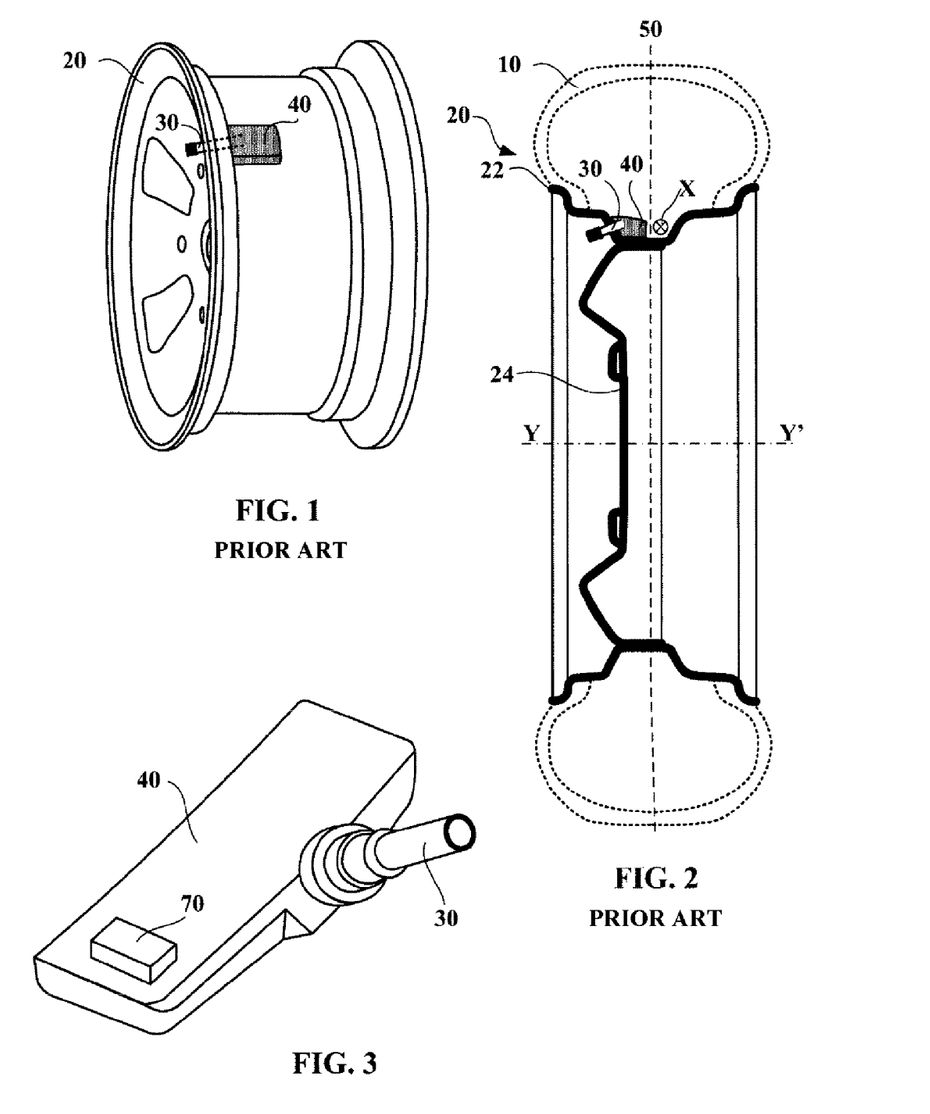
FIG. 1 diagrammatically represents a perspective view of a prior-art wheel fitted with a system of sensors joined to an inflation valve.
FIG. 2 diagrammatically represents a cross-sectional view of a prior-art wheel fitted with a system of sensors joined to an inflation valve.
FIG. 3 diagrammatically represents a perspective view of an inflation valve and a housing attached to the valve designed to accommodate sensors.

FIG. 1 represents a perspective view of a prior-art wheel 20 fitted with an inflating valve 30 and a casing 40 designed to receive sensors. For clarity, a tyre is not represented in FIG. 1.

FIG. 2 represents a cross-sectional view of another prior-art wheel 20 that includes a rim 22, a nave plate 24, and a tyre 10. This wheel 20 is fitted with an inflating valve 30 and a casing 40 designed to receive sensors. A representation of a median plane 50 of the tyre 10, that of a circumferential or tangential direction X at the level of the casing 40, and that of an axis of rotation YY' of the wheel 20 are also shown.

FIG. 3 diagrammatically represents a perspective view of an inflating valve 30 and a casing 40 joined to the valve 30 and intended to accommodate sensors. Such a casing 40 is known, for example, from document EP 1 106 397. The casing 40 can be adapted to receive a device 70 according to an embodiment of the invention.

Figure 4:
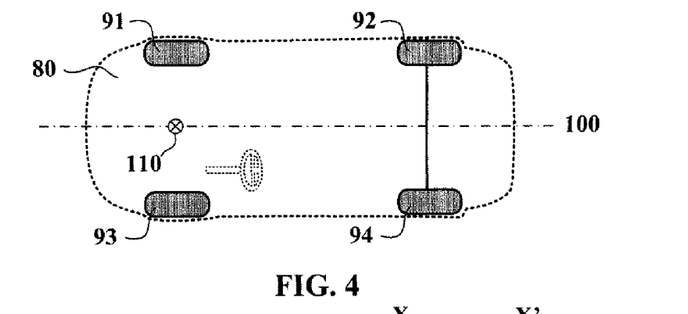
FIG. 4 diagrammatically represents a top view of a vehicle fitted with devices according to an embodiment of the invention.

FIG. 4 diagrammatically represents a top view of a vehicle 80 with wheels 91 to 94 that are fitted with devices according to an embodiment of the invention. Each device includes two magnetic sensors sensitive to the vehicle's environmental magnetic field, the two magnetic sensors being positioned in such a way that their axes are parallel and circumferentially offset.

Transfer of a wheel from a left side to a right side of the vehicle 80, keeping a same side or face of the wheel oriented externally or outside relative to the vehicle 80, is analysed as a rotation, possibly followed by a translation. Thus, if the wheel 91 or the wheel 92 is replaced by the wheel 93, the latter is turned or rotated 180° about an axis 110 perpendicular to the ground (to reach the side of the vehicle at which the wheel 91 is located), then there is an offset translation-wise (if the wheel 92 is the target of the transfer). The particular arrangement of the magnetic sensors causes the rotational symmetry of the device to be reduced, so that the relative configuration of the magnetic sensors is different on one side of the vehicle compared to the other. Even the rotation of the wheel about its axis of rotation while running does not make it possible to obtain the same relative configuration of the magnetic sensors on the two sides of the vehicle. This relative configuration is therefore characteristic of each side of the vehicle.

Figure 5:
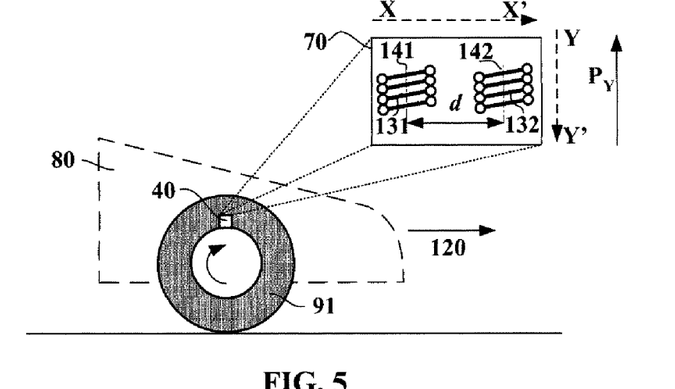
FIG. 5 diagrammatically represents a side view of a wheel fitted with a device according to an embodiment of the invention, mounted on a right side of a vehicle.
Figure 6:
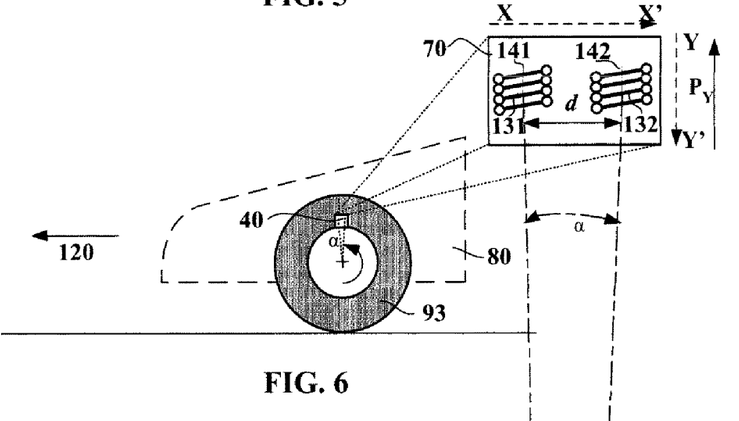
FIG. 6 diagrammatically represents a side view of a wheel fitted with a device according to an embodiment of the invention, mounted on a left side of a vehicle.

This fundamental observation is illustrated in FIGS. 5 and 6, which represent side views of wheels 91 and 93 fitted with a device 70 according to an embodiment of the invention, mounted on the right side of a vehicle 80 in FIG. 5, and mounted on the left side of the vehicle 80 in FIG. 6.

FIG. 5 shows the wheel 91 mounted on the front right position of the vehicle 80, which is moving in a direction 120, indicated by an arrow. The device 70 according to an embodiment of the invention is fitted in the casing 40 and fixed to the wheel 91. The device 70 includes two magnetic sensors 131 and 132 sensitive to the vehicle's environmental magnetic field P. Each magnetic sensor includes a coil with a soft iron core. The two coils 131 and 132 are arranged with their two axes, respectively 141 and 142, oriented parallel to an axis of rotation YY' of the tyre and wheel assembly 91. The two coils 131 and 132 are thus sensitive almost only to a component along a YY' or axial component of the vehicle's environmental magnetic field $P_Y$. The two axes 141 and 142 are also circumferentially offset, that is, offset in a direction XX', by a distance d. A corresponding azimuth offset α is illustrated in FIG. 6.

FIG. 6 shows the wheel 93 mounted in the front left position of the vehicle 80, which is moving in the direction 120. The same device 70 is fitted in the casing 40 and fixed in the same way to the assembly 93.

A comparison of FIGS. 5 and 6 makes it possible to understand an operation of a left-right self-locating device such as the device 70. When the wheel 91 provided with the device 70 is mounted on the right side of the vehicle 80 (as in FIG. 5), and when the vehicle 80 is moving, the coil 132 is always in phase advance over the coil 131; the wheel 91 must perform a rotation by a certain angle about its axis of rotation for the coil 131 to be in the same position relative to the vehicle's environmental magnetic field as the coil 132 initially. The situation is reversed for the wheel 93 provided with the device 70 mounted on the left side of the vehicle 80 (as in FIG. 6); here, it is the coil 131 that is in phase advance over the coil 132. It is therefore sufficient to determine a relative phase shift of signals measured by the two coils 131 and 132 to know, for a given direction of movement (forward or reverse) of the vehicle 80, the side of the vehicle with the coils 131 and 132 and thus the corresponding wheel.

Figure 7:
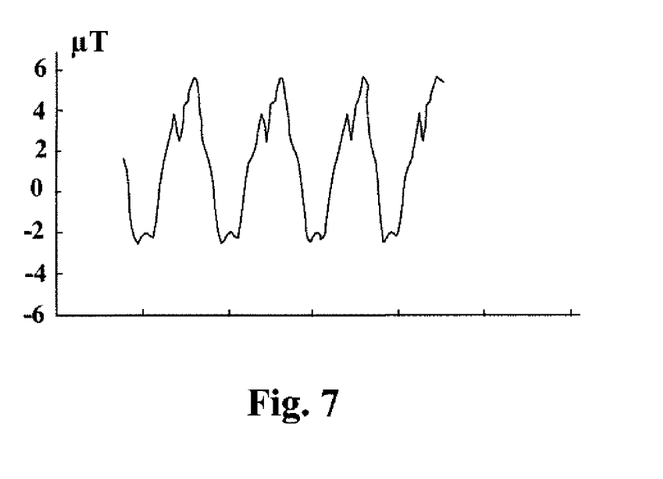
FIG. 7 shows a representation of an axial component of a remanent one-off magnetic field measured on a rear vehicle axle.

FIG. 7 shows a curve representing a component oriented along the axis YY' of the vehicle's environmental magnetic field measured with a magnetometer fixed to a rim of a wheel. This curve is measured in the case of a rear axle of a BMW 323i vehicle.

The magnetometer is fixed to the rim of the wheel in a position very close to that of a device fixed to a valve of this wheel. It can be seen that the vehicle's environmental field for the rear axle of this particular vehicle and assessed at the level of a casing fixed to an inflating valve has a peak-peak amplitude of the order of 9 μT.

Each coil is a passive magnetic sensor, which produces a signal proportional to variations in magnetic flux that passes through according to the Faraday-Lenz law. The signal generated by each coil is all the greater when the variations in magnetic flux passing through the coil are stronger and faster. The amplitude of the signal therefore also depends on the speed of rotation of the coil. In a particular embodiment, a value of the signal is integrated to retrieve a value of the field that is free of speed-related effects.

Figure 8:
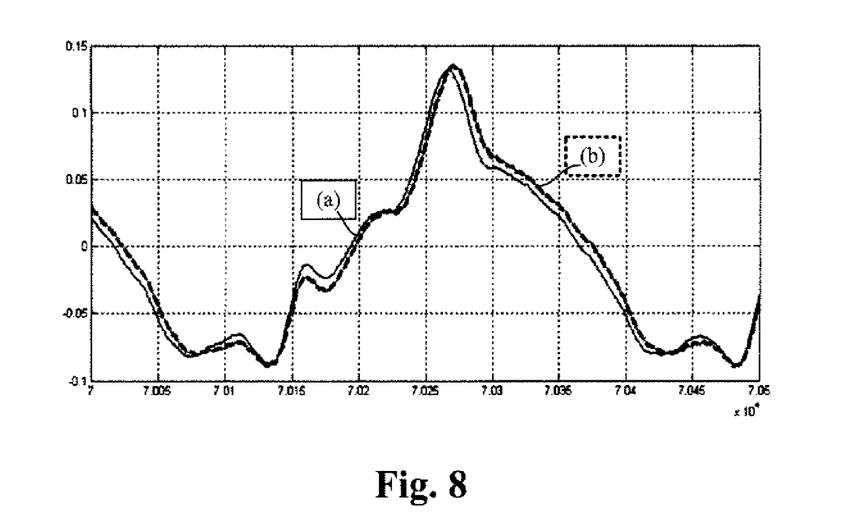
FIG. 8 shows representations of signals (a) and (b) obtained on a vehicle with wheels fitted with a device according to an embodiment of the invention, before digital processing.

FIG. 8 shows curves (a) and (b) representing the signals measured at the terminals of the two coils 131 and 132 according to an angle of rotation of the wheel (in degrees). Each coil produces a periodic signal, the periodicity of which is that of the rotation of the wheel. The frequency therefore depends on the speed of the vehicle. Limit values are reached when the vehicle's environmental magnetic field is aligned with the axis of the corresponding coil. The amplitude of the signal is independent of the terrestrial positioning of the vehicle. The phase shift is linked to an angle alpha (α), corresponding to the angle formed by the two centres of the coils 131 and 132 relative to the axis of rotation of the wheel. As an example, an offset of 2 cm relative to a circumference of 100 cm represents an angle of 2/100*360°=7.2°.

The curves (a) and (b) in FIG. 8 show the signals measured at the terminals of the coils 131 and 132 of the device 70 placed on the wheel 93 in conditions as represented in FIG. 6. The signal corresponding to the coil 132 is in phase delay relative to that corresponding to the coil 131. The situation would be reversed in the case of the situation represented in FIG. 5, where the signal from the coil 132 would be in phase advance relative to the signal from the coil 131. For a given direction of movement, it is therefore possible to determine the side on which the wheel is located from the relative phase shift of the signals measured by the two coils (or, in other words, from the sign of the phase shift of the signals).

Figure 9:
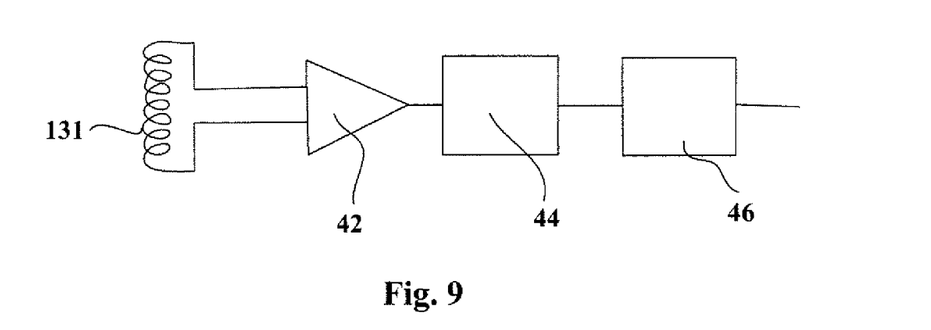
FIG. 9 is a functional diagram of a device according to an embodiment of the invention.

FIG. 9 presents a first functional block diagram of the device 70. For the measurement and the processing of a potential difference at the terminals of each coil 131, 132, the device 70 includes an amplification module 42 and a formatting module 44 including a filter having a cut-off frequency of a high-pass type equal to 19 Hz and a comparator. The device 70 also includes a computation unit 46 to which a formatted signal is outputted.

The computation unit 46 can perform several processing operations in succession or alternately.

According to a first processing operation, the computation unit 46 computes a characteristic quantity dependent on an energy of the signal, for example an integral of a square of the signal from one of the coils during a given time, and deduces therefrom a gradient of this integral as a function of time.

Figure 10:
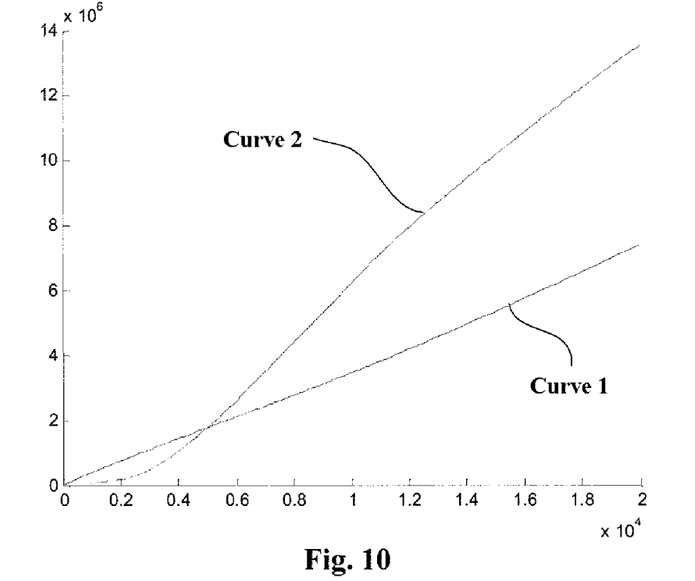
FIG. 10 shows a trend of two characteristic quantities of signals at terminals of magnetic sensors for a first vehicle.

FIG. 10 shows curves 1 and 2 representing trends as a function of time of this integral in the case of a BMW vehicle running at 40 km/hour in a straight line. The units of the figure are as follows: on the X axis, an arbitrary time unit (e.g., number of acquisition points) and, on the Y axis, an arbitrary unit of voltage at the terminals of the coil. Curve 1 represents a characteristic quantity of a front wheel; curve 2 represents a characteristic quantity of a rear wheel.

It can be seen that an average gradient is of the order of $3 \times 10^2$ for the front wheel and of the order of $8 \times 10^2$ for the rear wheel. A difference by a factor of 2.7 in favour of the rear is obtained.

This result illustrates that the front or rear location of a device can easily be determined, either by comparison between the two gradients, or by exceeding a given threshold.

Figure 11:
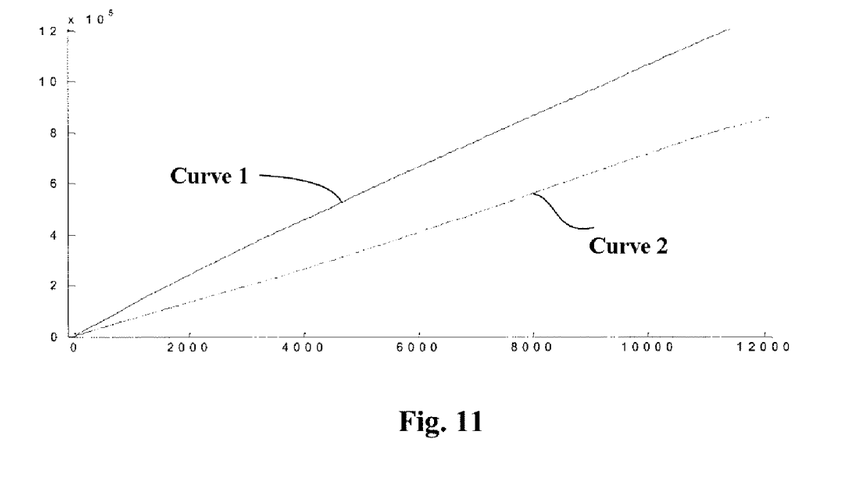
FIG. 11 shows a trend similar to that of FIG. 10, for a second vehicle.

FIG. 11 is similar to FIG. 10 but represents the case of a Citroen Saxo vehicle.

It can be seen that the average gradient of a characteristic quantity of a front wheel is 110 (curve 1), and 70 for a rear wheel (curve 2). The ratio between the two characteristic quantities is of the order of 1.6.

Figure 12:
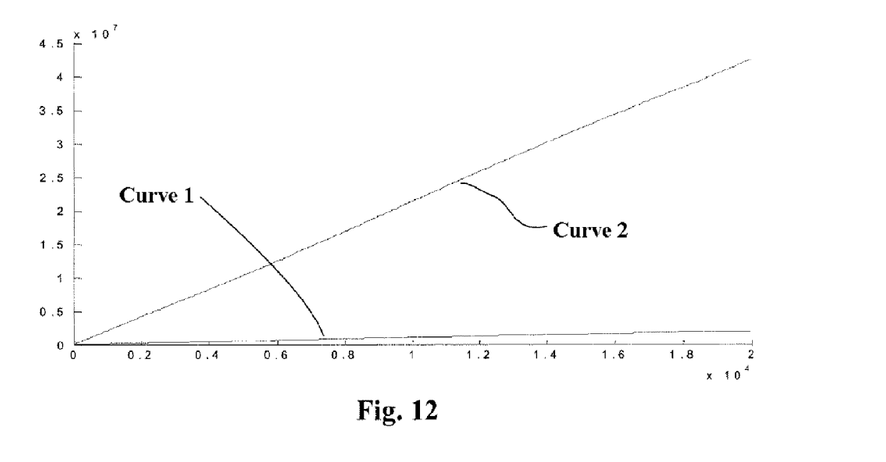
FIG. 12 shows a trend similar to that of FIG. 11, for a vehicle in which a rear local magnetic field has been reinforced.

FIG. 12 is similar to FIG. 11, and represents the case of a Citroën Saxo vehicle in which an environmental magnetic field thereof has been reinforced by adding a small magnet of a few millimetres in diameter in a housing of a rear wheel, close to a device of that wheel.

It can be seen that, with this magnet, a average gradient of a characteristic quantity of the rear wheel becomes of the order of $2.2 \times 10^3$ and a difference of more than an order of magnitude is maintained between the front and rear characteristic quantities.

This reinforcement of the local magnetic field is easy to produce and is very effective. It can also be done by reinforcing the magnetism of one of various metal parts of the vehicle's link to the ground, close to the housing of the wheel.

The device 70 preferably includes two coils. The computation unit 46 can thus determine a self-correlation function of signals at the terminals of the two coils. A level of this self-correlation function is influenced by a richness of the signal to be processed. The richer this signal is, the higher the value of the self-correlation function is.

Figure 13:
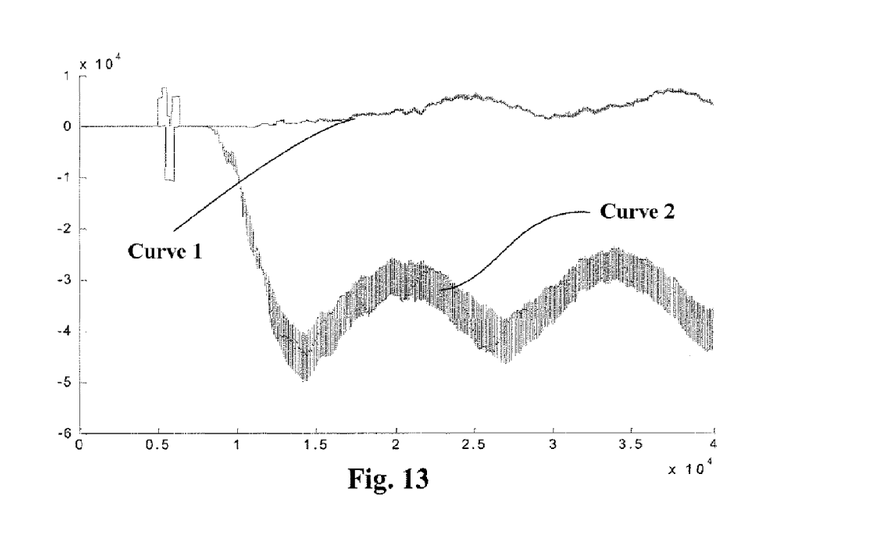
FIG. 13 shows a trend of two other characteristic quantities of signals for the first vehicle.

FIG. 13 illustrates levels obtained for self-correlation functions for a BMW vehicle running at 40 km/hour in a circle. Curve 1 corresponds to a signal from a front wheel, and curve 2 corresponds to a signal from a rear wheel.

It can be seen that an average level of the self-correlation function of the front wheel (curve 2) is of the order of $4 \times 10^3$ whereas that of the rear wheel (curve 1) is of the order of $4 \times 10^4$. There is practically an order of magnitude of difference between the two levels. This result is consistent with that given by the analysis of the energy of the signal. The BMW vehicle presents a higher environmental magnetic field at the rear than at the front of the vehicle.

Figure 14:
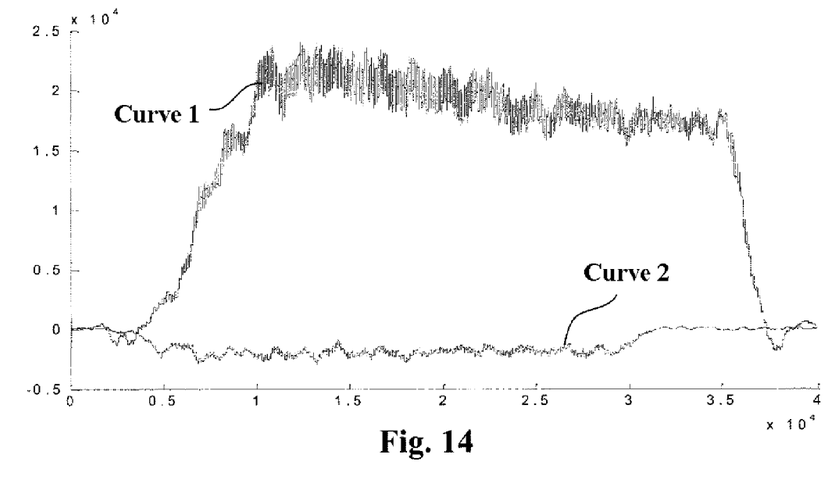
FIG. 14 is similar to FIG. 13, for the second vehicle.

FIG. 14 illustrates levels obtained from self-correlation functions for a Citroen Saxo vehicle running at 40 km/hour in a straight line. An average level of the front wheel (curve 2) is $2 \times 10^4$ and that of the rear wheel (curve 1) $2 \times 10^3$; there is again almost an order of magnitude of difference. This result is also consistent with that given by the analysis of the energy of the signal. The Citroën Saxo vehicle presents a higher environmental magnetic field at the front than at the rear of the vehicle.

The device 70 thus makes it possible, by applying the processing operations described, to locate the front or rear position of a wheel.

This device 70 also makes it possible, based on an analysis of the sign of the phase shift between the two signals, to determine a direction of rotation of the wheel and deduce from this direction of rotation and from a direction of movement of the vehicle, determined elsewhere by any method known per se, the right or left position of the corresponding tyre and wheel assembly.

Preferably, the computation unit 46 of the device 70 according to an embodiment of the invention determines the sign of the phase shift between the two signals obtained from the two coils by intercorrelation of these two signals.

This device 70 is adapted for private vehicle tyres of usual dimensions to an operating range between 20 and 120 km/h. For these tyres, a corresponding range of operating frequencies is 3 to 17 Hz. A cut-off frequency of the order of 19 Hz, with a filter adapted to the conditions of the vehicle, makes it possible to effectively eliminate influence of signals of a frequency equal to the frequency of rotation and thus eliminate spurious influence of the earth's magnetic field.

Figure 15:
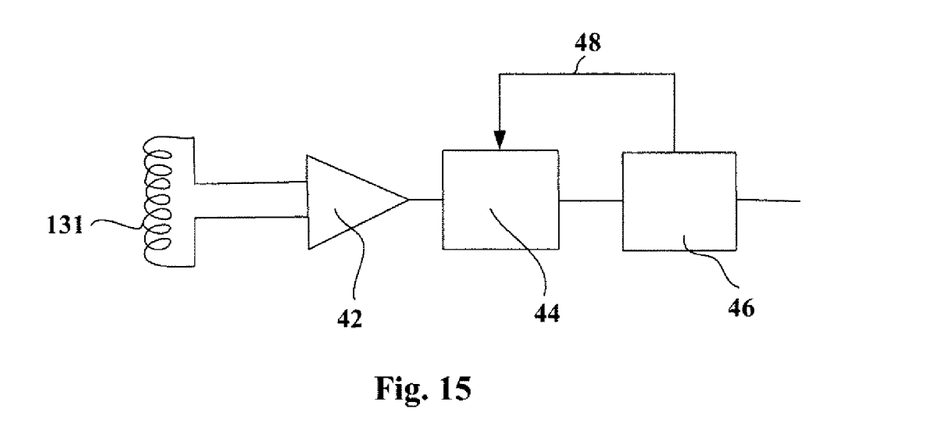
FIG. 15 is a functional diagram of a second device according to an embodiment of the invention.

FIG. 15 presents a variant of the device 70. In this variant, the formatting module 44 includes an adaptive filter with a cut-off frequency of a variable high-pass type according to a speed of rotation of the tyre and wheel assembly. A loop 48 links the computation unit 46 to the signal formatting module 44 to indicate the taking into account by the adaptive filter of the speed determined by the measuring unit. Preferably, the formatting module 44 is looped back on the amplitude of the signal, this amplitude is directly dependent on the speed. It is therefore very easy to determine the speed of rotation from the measured amplitude.

The information is transmitted wirelessly to a central processing unit onboard the vehicle.

Of course, aspects of the invention can be exploited reliably in a method for determining the positioning of a wheel only if the device 70 is fixed to the same side of the wheel relative to the vehicle for all the assemblies 91 to 94 whose positioning must be determined. It is unimportant for it always to be the outer side or always the inner side relative to the vehicle, provided that it is always the same side. The fixing of the device to an inflating valve constitutes a particularly simple way of ensuring that all the devices are located on the outer side relative to the vehicle.

It can be seen from the description of the invention that the direction of movement is an important parameter in identifying the left or right positioning of the wheels. A reversal of the direction leads to a reversal of the phase shift of the signals from the two coils 131 and 132. The direction of movement can be determined using a known device (such as, for example, a ball device described in document EP 0 760 299), using signals existing in the vehicle (e.g., power supplied to the reversing lights) or even from the speed of the vehicle (which can be determined from the frequency of the signals measured by each of the two coils 131 and 132). By deactivating a procedure for determination of the positioning when the speed is less than a certain limit (for example, 30 km/h), the vehicle is certain to be moving forward when the determination is made.

The methods described in this document thus make it possible not only to determine the side of the vehicle on which a wheel is located but also the precise front or rear position on the vehicle.

The invention is not limited to the examples described and represented, and various modifications can be made thereto without departing from the scope defined by the appended claims.

The invention claimed is:

1. A method of identifying a position of a wheel of a vehicle, comprising steps of:
providing, in a first wheel of the vehicle, a first device with a magnetic sensor with a maximum sensitivity axis;
measuring at terminals of the magnetic sensor of the first device a first signal representative of time variations of a magnetic flux during rotation of the first wheel while the vehicle is in operation;
determining a characteristic quantity of the first signal;
comparing the characteristic quantity to a given threshold to obtain a comparison result; and
determining, according to the comparison result, whether the first wheel is in a front location or a rear location.

2. The method according to claim 1, further comprising steps of:
providing, in a second wheel of the vehicle, a second device with a magnetic sensor with a maximum sensitivity axis, wherein one of the first and second devices is located in a front wheel of the vehicle and another of the first and second devices is located in a rear wheel of the vehicle;
measuring at terminals of the magnetic sensor of the second device a second signal representative of time variations of a magnetic flux during rotation of the second wheel while the vehicle is in operation;
determining a characteristic quantity of the second signal;

transmitting the characteristic quantities of the first and second signals from the first and second devices to a central processing unit of the vehicle; and comparing the characteristic quantities to determine whether the first device is in the front wheel or in the rear wheel.

3. A method according to claim 2,
wherein the characteristic quantity of the first signal is dependent on an energy of the first signal, and
wherein the characteristic quantity of the second signal is dependent on an energy of the second signal.

4. A method according to claim 2,
wherein the characteristic quantity of the first signal is obtained by calculating an integral of an absolute value of the first signal during a given time, and
wherein the characteristic quantity of the second signal is obtained by calculating an integral of an absolute value of the second signal during a given time.

5. A method according to claim 2,
wherein the vehicle includes a first magnetic field generator close to the first wheel provided with the first device, and
wherein the vehicle includes a second magnetic field generator close to the second wheel provided with the second device.

6. A method according to claim 2,
wherein magnetization of a metal part of the vehicle is reinforced close to the first wheel provided with the first device, and
wherein magnetization of a metal part of the vehicle is reinforced close to the second wheel provided with the second device.

7. A method according to claim 2,
wherein the first device includes two magnetic sensors with different azimuth angles and in similar positions relative to an axis of rotation of the first wheel, and
wherein the second device includes two magnetic sensors with different azimuth angles and in similar positions relative to an axis of rotation of the second wheel.

8. A method according to claim 7,
wherein a characteristic quantity of first representative signals from the two magnetic sensors of the first device is a self-correlation function of the first representative signals calculated during a given time, and
wherein a characteristic quantity of second representative signals from the two magnetic sensors of the second device is a self-correlation function of the second representative signals calculated during a given time.

9. A method according to claim 8,
wherein, from the self-correlation function of the first representative signals from the two magnetic sensors of the first device, and by comparison to a given threshold, a front position or a rear position of the first device is determined, and
wherein, from the self-correlation function of the second representative signals from the two magnetic sensors of the second device, and by comparison to a given threshold, a front position or a rear position of the second device is determined.

10. A method according to claim 8,
wherein, from the self-correlation function of the first representative signals from the two magnetic sensors of the first device, a direction of rotation of the first wheel of the vehicle is determined, and
wherein, from the self-correlation function of the second representative signals from the two magnetic sensors of the second device, a direction of rotation of the second wheel of the vehicle is determined.

11. A method according to claim 10,
wherein a first direction of movement of the vehicle is determined by comparing the characteristic quantity of the first representative signals to a given threshold,
wherein, from the characteristic quantity of the first representative signals and from the first direction of movement, a left position or a right position is determined for the first wheel,
wherein a second direction of movement of the vehicle is determined by comparing the characteristic quantity of the second representative signals to a given threshold, and
wherein, from the characteristic quantity of the second representative signals and from the second direction of movement, a left position or a right position is determined for the second wheel.

12. A method according to claim 7,
wherein a circumferential distance between centers of the two magnetic sensors of the first device is between 1 and 8 cm, and
wherein a circumferential distance between centers of the two magnetic sensors of the second device is between 1 and 8 cm.

13. A method according to claim 7,
wherein the two magnetic sensors of the first device have their maximum sensitivity axes substantially circumferentially oriented, and
wherein the two magnetic sensors of the second device have their maximum sensitivity axes substantially circumferentially oriented.

14. A method according to claim 7,
wherein the two magnetic sensors of the first device have their maximum sensitivity axes oriented substantially parallel to an axis of rotation of the first wheel, and
wherein the two magnetic sensors of the second device have their maximum sensitivity axes oriented substantially parallel to an axis of rotation of the second wheel.

15. A method according to claim 2,
wherein the first device includes a filtering element that eliminates a component of the first signal having a frequency less than or equal to a given frequency, and
wherein the second device includes a filtering element that eliminates a component of the second signal having a frequency less than or equal to a given frequency.

16. A method according to claim 1, wherein the characteristic quantity of the first signal is dependent on an energy of the first signal.

17. A method according to claim 1, wherein the characteristic quantity of the first signal is obtained by calculating an integral of an absolute value of the first signal during a given time.

18. A method according to claim 1, wherein the vehicle includes a first magnetic field generator close to the first wheel provided with the first device.

19. A method according to claim 1, wherein magnetization of a metal part of the vehicle is reinforced close to the first wheel provided with the first device.

20. A method according to claim 1, wherein the first device includes two magnetic sensors with different azimuth angles and in similar positions relative to an axis of rotation of the first wheel.

21. A method according to claim 20, wherein which a characteristic quantity of first representative signals from the two magnetic sensors of the first device is a self-correlation function of the first representative signals calculated during a given time.

22. A method according to claim 21, wherein, from the self-correlation function of the first representative signals from the two magnetic sensors of the first device, and by comparison to a given threshold, a front position or a rear position of the first device is determined.

23. A method according to claim 21, wherein, from the self-correlation function of the first representative signals from the two magnetic sensors of the first device, a direction of rotation of the first wheel of the vehicle is determined.

24. A method according to claim 23,
wherein a first direction of movement of the vehicle is determined by comparing the characteristic quantity of the first representative signals to a given threshold, and
wherein, from the characteristic quantity of the first representative signals and from the first direction of movement, a left position or a right position is determined for the first wheel.

25. A method according to claim 20, wherein a circumferential distance between centers of the two magnetic sensors of the first device is between 1 and 8 cm.

26. A method according to claim 20, wherein the two magnetic sensors of the first device have their maximum sensitivity axes substantially circumferentially oriented.

27. A method according to claim 20, wherein the two magnetic sensors of the first device have their maximum sensitivity axes oriented substantially parallel to an axis of rotation of the first wheel.

28. A method according to claim 1, wherein the first device includes a filtering element that eliminates a component of the first signal having a frequency less than or equal to a given frequency.

29. A system for monitoring wheels of a vehicle, comprising:
in the vehicle, a central processing unit with a receiver and a processor; and
in each wheel, a device including:
a magnetic sensor with a maximum sensitivity axis,
a signal measurement circuit that measures, at terminals of the magnetic sensor, a signal representative of time variations of a magnetic flux time during rotation of the wheel,
a computation unit, and
a transmitter,
wherein each magnetic sensor has its maximum sensitivity axis arranged parallel to an axis of rotation of a corresponding wheel thereof,
wherein each computation unit calculates a characteristic quantity that is a function of an energy of a signal measured at terminals of a corresponding magnetic sensor thereof,
wherein the processor of the central processing unit determines, from the characteristic quantities transmitted by the devices of the wheels of the vehicle, a front location or a rear location of each device.

30. A system for monitoring the wheels of a vehicle comprising:
in the vehicle, a central processing unit with a receiver and a processing unit; and
in each wheel, a device including:
two magnetic sensors, each with maximum sensitivity axes,
a signal measuring circuit that measures, at terminals of each of magnetic sensor,
a signal representative of magnetic flux time variations during rotation of the wheel,
a computation unit, and
a transmitter,
wherein, for each device, the two magnetic sensors of the device are positioned at different azimuths and similar positions relative to an axis of rotation of a corresponding wheel in which the device is included,
wherein, for each device, the computation unit of the device is able to calculate a self-correlation function of signals measured at the terminals of the two magnetic sensors of the device, and
wherein the processing unit of the central processing unit is able to determine, from the self-correlation functions transmitted by the devices of the wheels of the vehicle, a front or rear and left or right locations of each of the devices of the vehicle.

* * * * *

UNITED STATES PATENT AND TRADEMARK OFFICE
CERTIFICATE OF CORRECTION

Page 1 of 1

PATENT NO. : 8,527,134 B2
APPLICATION NO. : 13/126121
DATED : September 3, 2013
INVENTOR(S) : Xavier Huchard It is certified that error appears in the above-identified patent and that said Letters Patent is hereby corrected as shown below:

In the Specification

Column 4
Line 43, "device is determined." should read --device.--.

In the Claims

Column 12
Line 66, "which" should be deleted.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*